US005914722A

United States Patent [19]

Aleksic

[11] Patent Number: 5,914,722

[45] Date of Patent: Jun. 22, 1999

[54] MEMORY EFFICIENT METHOD FOR TRIANGLE RASTERIZATION

[75] Inventor: Milivoje Aleksic, Richmond Hill, Canada

[73] Assignee: ATI Technologies Inc., Unionville, Canada

[21] Appl. No.: 08/838,888

[22] Filed: Apr. 14, 1997

[51] Int. Cl.[6] ...... G06F 15/00

[52] U.S. Cl. ...... 345/423; 345/441; 345/434

[58] Field of Search ...... 345/423, 434, 345/433, 441

[56] References Cited

PUBLICATIONS

Bae et al., "Patch Renderer: A New Parallel Hardware Architecture For Fast Polygon Rendering", Circuits and Systems, IEEE International, 1991.

"PC Graphics Reach New Level:3D", Yang Yao, Microprocessor Report, vol. 10, No. 1, Jan. 22, 1996.

"Talisman:Commodity Realtime 3D Graphics for the PC", Jay Torborg and James Kajiya, Sigraph 1996.

"Fundamentals of Interactive Computer Graphics", J.D. Foley and A. Van Dam, pp. 886–873, Addison–Wesley Publishing Co., 1992.

*Primary Examiner*—Mark K. Zimmerman
*Assistant Examiner*—Chante' Harrison
*Attorney, Agent, or Firm*—Pascal & Associates

[57] ABSTRACT

A method of rasterization of a polygon in a 3D draw engine, comprising storing data defining a polygon in a memory organized in pages, the polygon crossing a memory page boundary, comprising rasterizing a first portion of the polygon contained within a memory page, and subsequently rasterizing a second portion of the polygon which is located outside the memory page.

6 Claims, 3 Drawing Sheets

MEMORY EFFICIENT METHOD FOR TRIANGLE RASTERIZATION

FIELD OF THE INVENTION

This invention relates to computer systems and in particular to an improvement to 3D graphics control subsystems.

BACKGROUND TO THE INVENTION

Computer processing of 3D graphics can be considered as a three stage pipeline, comprising the general steps of tesselation, geometry and rendering. Tesselation involves the creation of a description of an object, and converting the description to a set of triangles. The geometry stage involves transformation, that is the scaling and rotation of the triangles, and lighting, that is the determination of the brightness, shading and texture characteristics of each triangle. The rendering stage involves the calculation of all attributes of the pixels forming the triangles, e.g. color, light, depth and texture. The rendering stage creates a two dimensional display from the triangles created in the geometry stage.

Background information concerning these functions can be obtained in the articles "PC Graphics Reach New Level: 3D", by Yong Yao, published in Microprocessor Report, Vol 10, No 1, Jan. 22, 1996, "Talisman: Commodity Realtime 3D Graphics for PC", by Jay Torborg and Jim Kajiya, Sigraph 1996, as well as at pages 866–873 of the text "Fundamentals of Interactive Computer Graphics", by J. D. Foley and A. Van Dam, Addison-Wesley Publishing Company, copyright 1982.

Theoretically, 3D graphics can be controlled entirely by software. However even a central processor (CPU) with performance 10 times faster that current fast CPUs (e.g. the Pentium 200) may not be fast enough for professional level 3D graphics or high quality game programs, as will be shown below. For that reason, a 3D graphics accelerator (hardware) is desirable to speed up 3D graphics processing.

In the rendering stage, data is processed pixel by pixel. It is required that a rendering engine must calculate all attributes of the pixel, color, light depth and texture, and therefore must be able to process millions of polygons per scene and construct a quality 2D representation in real time, for animation.

A typical geometry stage is done using the vertex of each triangle, and requires 100 floating point operations per second (FLOPS) per vertex. For two million vertices, this means that 200 million FLOPS are required per second. This is twice as fast as a current low cost CPU can perform, and one quarter of the maximum claimed speed of recent media processors (800 million FLOPS per second). However as CPU speed appears to be doubling each year, it is considered that it is not currently necessary to increase the speed of the geometry stage by special hardware.

The required memory bandwidth for a 1024×768 24-bit display at a 75 Hz refresh rate, with a Z-buffer (a buffer for data describing the third dimension Z) and using texture mapping, is more than 4 Gbytes (4,000 million bytes). Maximum required memory bandwidth is estimated to be 12,000 million bytes per second. This is far in excess of current available bandwidth, estimated to be 500 million bytes per second. Even with doubling of memory bandwidth every three years, it is clear that memory bandwidth represents a significant processing bottleneck.

Thus the geometry stage is often contained in a 3D graphics accelerator.

Synchronous dynamic random access memories (SDRAMs) have been found to be very efficiently accessed, if addresses belong to the same row; only one clock cycle per access is required. When a following address access is in a different row, a delay is incurred for the accessing circuit to switch to the new row, which delay is called page fault (pageFault). In current SDRAM technology, the page fault cost is 7–10 clock cycles (e.g. pageFault=7).

Reference is now made to FIG. 1, which illustrates pertinent parts of a computer used to carry out 3D graphics processing. Illustrated is a processor (CPU) 1, operating in accordance with programs stored in random access memory (RAM) 3, communicating with each other via a bus 5. The CPU also communicates with a graphics subsystem 7, to which a 3D accelerator 9 is connected. Video RAM 11 is connected to the 3D accelerator, or to the graphics subsystem for storage of processed and to-be-processed display data as will be described below. The graphics subsystem and 3D accelerator are connected to a digital to analog (D/A) converter 13 which converts 3D digital signals to be displayed in 2D received from the accelerator, or other display data received from the graphics subsystem, to analog signals such as the well known standard RGB signals, which are applied to display 15.

Reference is no made to FIG. 2, which illustrates a triangle which is prepared for rendering. The three dimensional coordinates x,y and z of each of the vertices A, B and C of the triangle as well as other attributes as will be described below are stored in RAM 11.

FIG. 3 illustrates the steps of a method of rendering in accordance with the prior art. Firstly the triangle parameters are calculated in a triangle setup stage: slope of the color, texture coordinates depth and light.

The next stage, referred to as edge walking, is considering pixel parameters along the left and right edges of the triangle, by calculating the starting and ending values for a current scan line, and the span attributes. Span is defined by a starting x coordinate value, an ending x coordinate value, starting and ending values of color, light, depth and texture. This is followed by incrementing in the y coordinate direction and repeating the above steps. After pixel calculation, the data is stored in a memory such as VRAM, and is passed through the D/A converter to the display.

As noted earlier, each step in the y direction incurs a pageFault delay time cost. In the prior art, drawing each span begins with a page fault. For an n-pixel-span triangle, the extra penalty for page fault is n*(pageFault), which is typically n*7. For example for a 50 pixel triangle, with a 10 pixel base and 10 pixel height, the page fault time penalty is 10*7=70 clock cycles. If one memory access contains 4 pixels (2 bytes per pixel, a memory width of 2*4=8 bytes), for all 50 pixels calculated without page fault, 50/4=12.5 clock cycles are required. However with page fault, the penalty is 5 times larger than that without considering page fault.

One proposed solution to decrease page fault is to organize a memory using tiling, i.e. the memory is organized in pages, as shown in FIG. 4A. In the example shown in FIG. 4A, the data description of a triangle 15 is contained entirely within a memory page 17. Thus, only a single page fault is incurred, which is the advantage of tiling.

However, if as shown in FIG. 4B the triangle crosses the page boundary, it has been found that there is an enormously high page fault, e.g. 70 clock cycles for a 50 pixel triangle, which is highly undesirable.

SUMMARY OF THE INVENTION

The present invention is a method of rendering a triangle, with a minimal number of memory page faults. This is achieved by first rasterizing only that part of a triangle which is within the boundaries of the page, then rasterizing the remaining part of the triangle which is outside the boundaries of the page.

In accordance with an embodiment of the invention, a method of rasterization of a polygon in a 3D draw engine comprises storing data defining a polygon in a memory organized in pages, the polygon crossing a memory page boundary, comprising rasterizing a first portion of the polygon contained within a memory page, and subsequently rasterizing a second portion of the polygon which is located outside the memory page.

In accordance with another embodiment, the method includes the steps of (a) incrementing an x coordinate of a line of pixels of the polygon from a start position, to the page boundary, (b) defining a new x coordinate at the page boundary for the second portion of the polygon which is located on the same line but is outside the page, and a new span length of the line for the second portion of the polygon to the boundary of the polygon outside the page, (c) incrementing a y coordinate in a direction orthogonal to the x direction, (d) repeating steps (a), (b) and (c) to a y coordinate boundary of the polygon, and (e) following rasterizing the first portion of the polygon, rasterizing the second portion of the polygon using the new x coordinates and new span lengths.

BRIEF INTRODUCTION TO THE DRAWINGS

A better understanding of the invention will be obtained by considering the detailed description below, with reference to the following drawings, in which:

FIG. 1 is a block diagram of parts of a computer system on which the present invention can be implemented, FIG. 2 illustrates a triangle used in 3D rendering, in a set of coordinates, FIG. 3 is a flow chart illustrating a method of rendering used in the prior art, FIG. 4A is a 3D triangle contained within a page, FIG. 4B is a 3D triangle which crosses a boundary of a page, FIG. 5 is a flow chart illustrating a method of rendering in accordance with an embodiment of the present invention, and FIG. 6 illustrates a line to be rastered in accordance with an embodiment of the present invention, and FIG. 7 illustrates a triangle contained in two adjacent memory pages.

DETAILED DESCRIPTION OF AN EMBODIMENT OF THE PRESENT INVENTION

Figure 1:
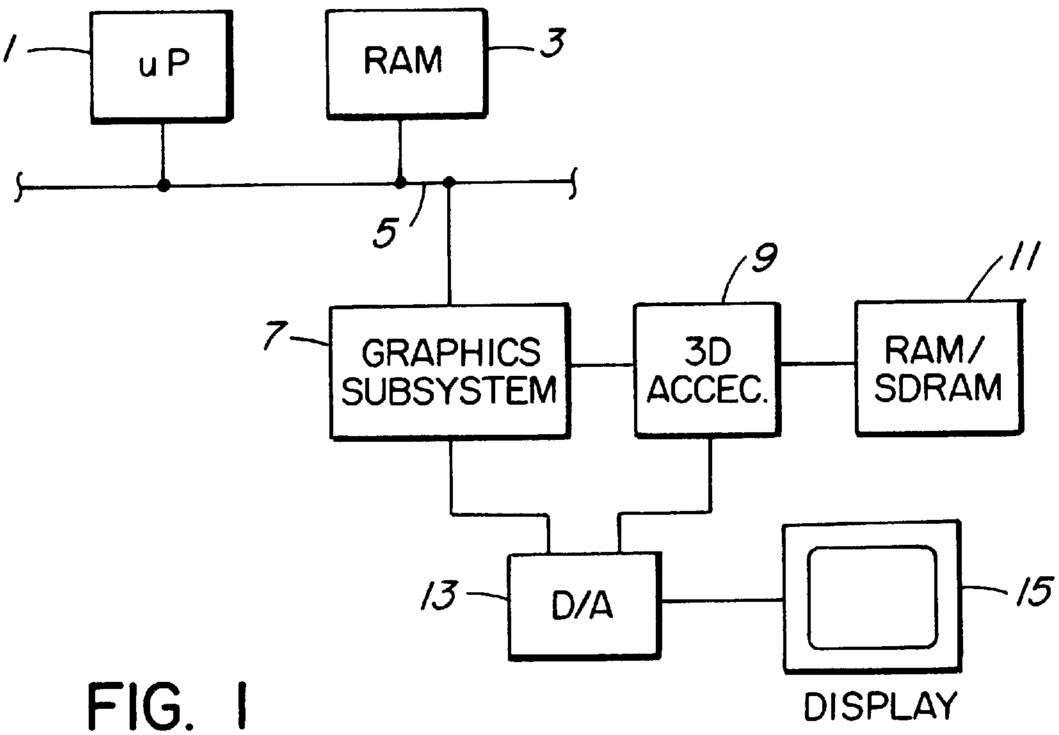
Figure 2:
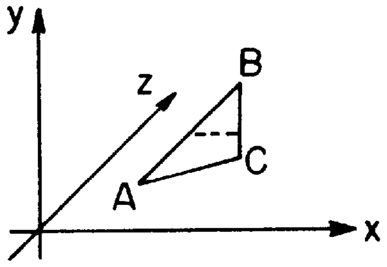
Figure 4A:
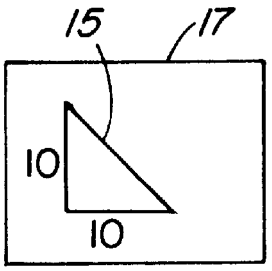
Figure 4B:
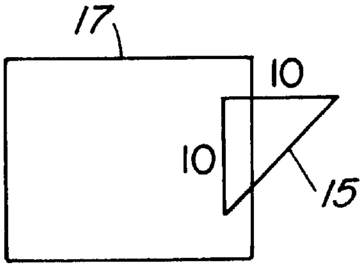
Figure 3:
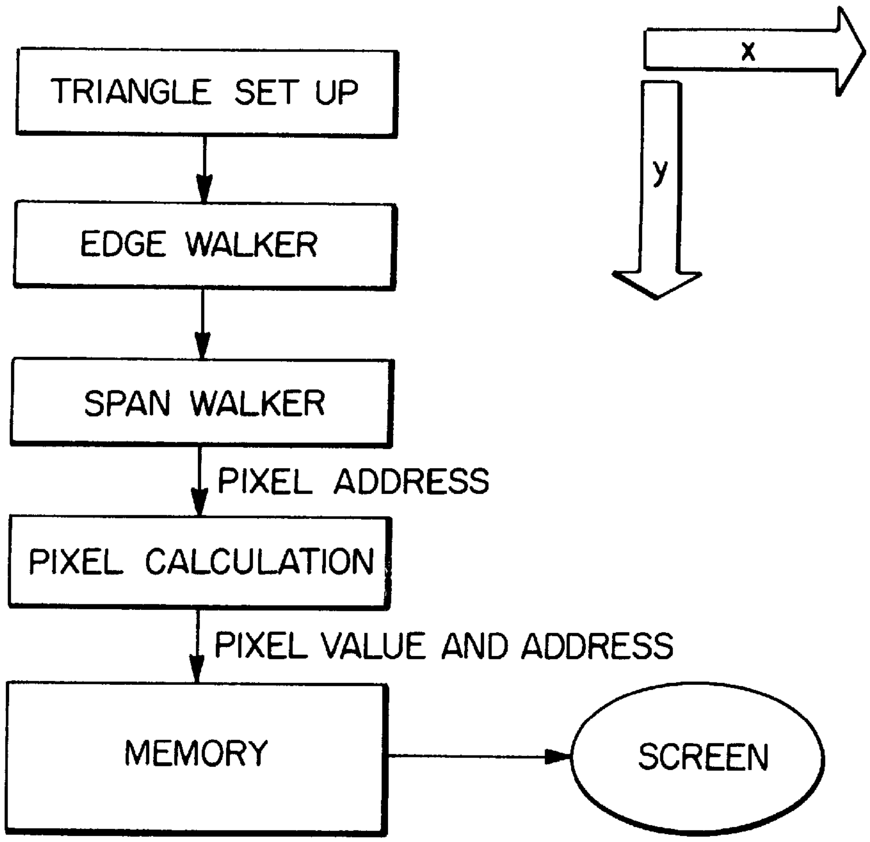
PRIOR ART FIG. 3
Figure 7:
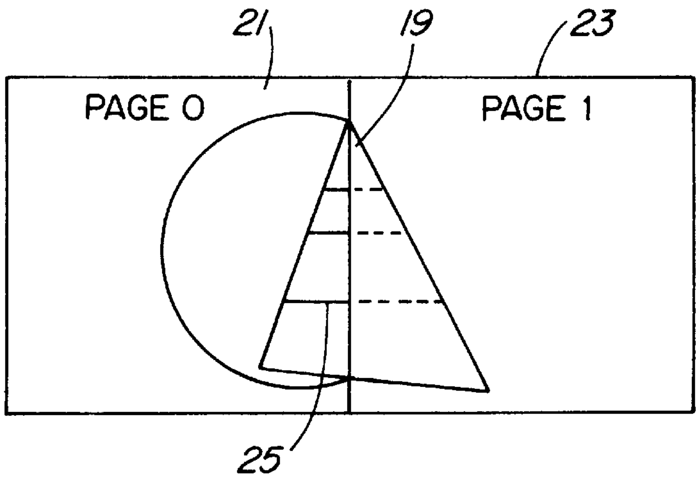
Figure 5:
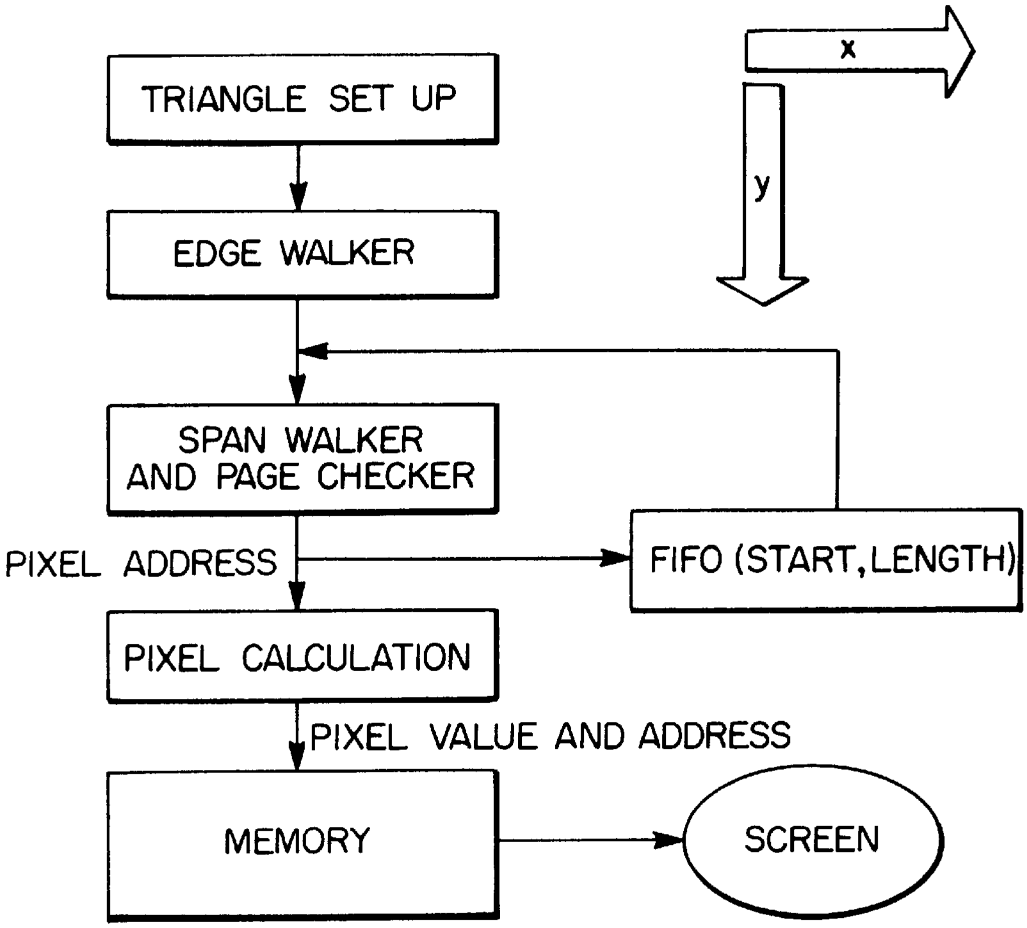
Figure 6:
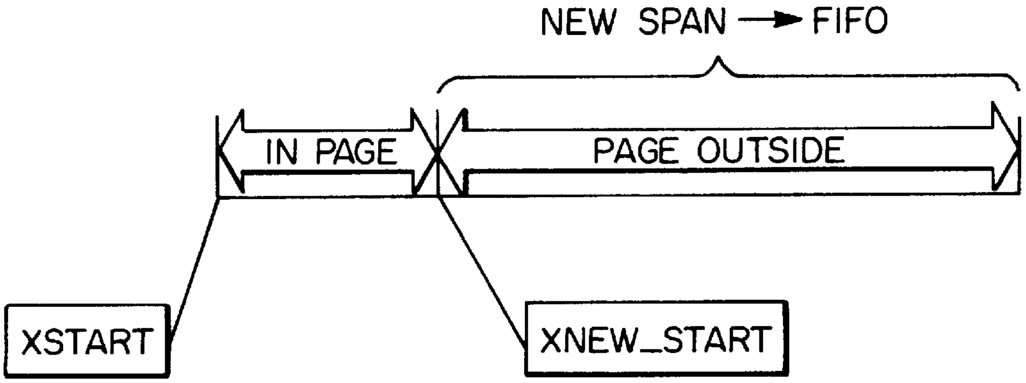

Turning now to FIGS. 5, 6 and 7, the triangle is set up as in the prior art, the data stored in preferably an SDRAM or SGRAM memory 11 set up in two-dimensional pages, i.e. tiled, with N×M pixels within each page. FIG. 7 illustrates a triangle 19 which crosses a page boundary between the two pages, page 0 (21) and page 1 (23). As noted earlier, an enormous page fault penalty would be incurred in rendering this triangle.

In accordance with an embodiment of the invention, an edge walker in a span engine in the 3D accelerator walks along each span 25, incrementing an x coordinate of pixels along the span and decrementing the number of pixels making up the span. The span engine also determines the location of the page boundary.

When the x coordinate crosses the page boundary coordinate, the current pixel coordinates (x,y) and the number of pixels left in the span are stored as data entries in a first-in first-out (FIFO) buffer, which can be a RAM memory connected to or being part of the 3D accelerator. The y coordinate is then incremented and the process is repeated, until the entire part of the triangle within the page 21 has been rasterized. The data entries in the FIFO buffer represent the part of the triangle which is outside the page 21, and is contained in adjacent page 23.

After the triangle rasterization is completely done for the part of the triangle which is in the current memory page, the span engine consumes the data stored in the FIFO memory as a new span source, rasterizing the part of the triangle which is outside page 21. The drawing phase follows the same pattern as before, i.e. drawing everything which is within current page 23.

One span line is illustrated in FIG. 6, which is defined by the $x_{start}$ triangle boundary x coordinate and span length of the entire line. The span engine splits the span length to a span length which is inside the current page (in$_{13}$ page) having an x coordinate $x_{start}$ and span$_{13}$ length$_{13}$ in$_{13}$ page, and span outside the current page defined by xnew$_{start}$ (the x coordinate at the page boundary) and the span length of the triangle line outside the current page: new$_{13}$ span$_{13}$ length=(span$_{13}$ length _span$_{13}$ length$_{13}$ in$_{13}$ page).

Thus with reference to FIG. 7, rasterization of triangle 19 is carried out, wherein triangle 19 crosses a page boundary between page 21 and page 23. In a first pass, the span engine draws only pixels inside the current page, and the coordinates and span lengths are successively stored in the feedback FIFO. In the next pass, the FIFO becomes the source, in a manner similar to the data determined by the edge walker. The data drawn in page 23, from the FIFO, is illustrated as the representative dashed lines.

Thus in accordance with the present invention, only one page fault is incurred to render the entire triangle, which using a current SDRAM involves only 7 clock cycles penalty for the triangle, in comparison with conventional rendering requiring 10 page faults (7*10=70 clock cycles). Clearly there is substantial speed increase using the present invention.

While the present invention has been described with reference to rasterization of triangular polygons, the principles of the invention can be used with any arbitrary polygon rasterization.

Further, it should also be noted that when the span engine generates pixel data, data for one or plural pixels can be generated in parallel, or sequentially.

A person understanding this invention may now conceive of alternative structures and embodiments or variations of the above. All those which fall within the scope of the claims appended hereto are considered to be part of the present invention.

I claim:

1. A method of rasterization of a polygon in a 3D draw engine, comprising storing data defining a polygon in a memory organized in pages, the polygon crossing a memory page boundary, comprising completely rasterizing a first portion of the polygon contained within a memory page, and subsequently completely rasterizing a second portion of the polygon which is located outside the memory page, said method including the steps of (a) incremeneting an x coordinate of a line of pixels of the polygon from a start position, to the page boundary, (b) defining a new x coordinate at the page boundary for the second portion of the polygon which is located on the same line but is outside the page, and a new span length of the line for the second portion of the polygon to the boundary of the polygon outside the page, (c) incrementing a y coordinate in a direction orthogonal to the x direction, (d) repeating steps (a), (b) and (c) to a y coordinate boundary of the polygon, and (e) following rasterizing of the first portion of the polygon, rasterizing the second portion of the polygon using the new x coordinates and new span lengths.

2. A method as defined in claim 1 including storing successively each new x coordinate and new span length for each line in a FIFO buffer until rasterizing of the first portion of the polygon has been completed, then using the new x coordinates and new span lengths stored in the FIFO buffer successively in rasterizing the second portion of the polygon.

3. A method as defined in claim 1 carried out in a span engine of a graphics accelerator.

4. A method as defined in claim 2 in which the polygon is a triangle.

5. A method as defined in claim 1 in which the memory is an SDRAM or an SGRAM.

6. A method as defined in claim 2 in which the FIFO is contained in a random access memory.

* * * * *